United States Patent
Liu et al.

(10) Patent No.: US 7,315,026 B2
(45) Date of Patent: Jan. 1, 2008

(54) SYSTEM, METHOD AND APPARATUS FOR IMPROVING STABILIZATION IN SOLID STATE X-RAY DETECTORS

(75) Inventors: James Z. Liu, Glenview, IL (US);
Olgun Kukrer, Waukesha, WI (US);
Kenneth S. Kump, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 83 days.

(21) Appl. No.: 11/063,909

(22) Filed: Feb. 22, 2005

(65) Prior Publication Data

US 2006/0186343 A1    Aug. 24, 2006

(51) Int. Cl.
*G01T 1/24* (2006.01)
(52) U.S. Cl. ............................... 250/370.09
(58) Field of Classification Search ............ 250/370.09
See application file for complete search history.

(56) References Cited

U.S. PATENT DOCUMENTS

| | | | |
|---|---|---|---|
| 6,518,575 B1* | 2/2003 | Imai | 250/370.09 |
| 2005/0253097 A1* | 11/2005 | Agano | 250/591 |
| 2006/0109958 A1* | 5/2006 | Ertel et al. | 378/205 |

* cited by examiner

*Primary Examiner*—David Porta
*Assistant Examiner*—Marcus H Taningco
(74) *Attorney, Agent, or Firm*—McAndrews, Held & Malloy, Ltd.; Peter J. Vogel; Michael A. Dellapenna

(57) ABSTRACT

Certain embodiments of the present invention include a method, system, and apparatus for improved stabilization in solid state x-ray detectors. A method for detecting x-rays includes providing a top layer including an exterior surface and interior surface. The interior surface of the top layer is substantially electrically non-dissipative. The method also includes providing an electrical ground path and an electrically dissipative layer adjacent to the interior surface of the top layer. The electrically dissipative layer is capable of facilitating discharge of static charge from the interior surface of the top layer to the electrical ground path.

18 Claims, 3 Drawing Sheets

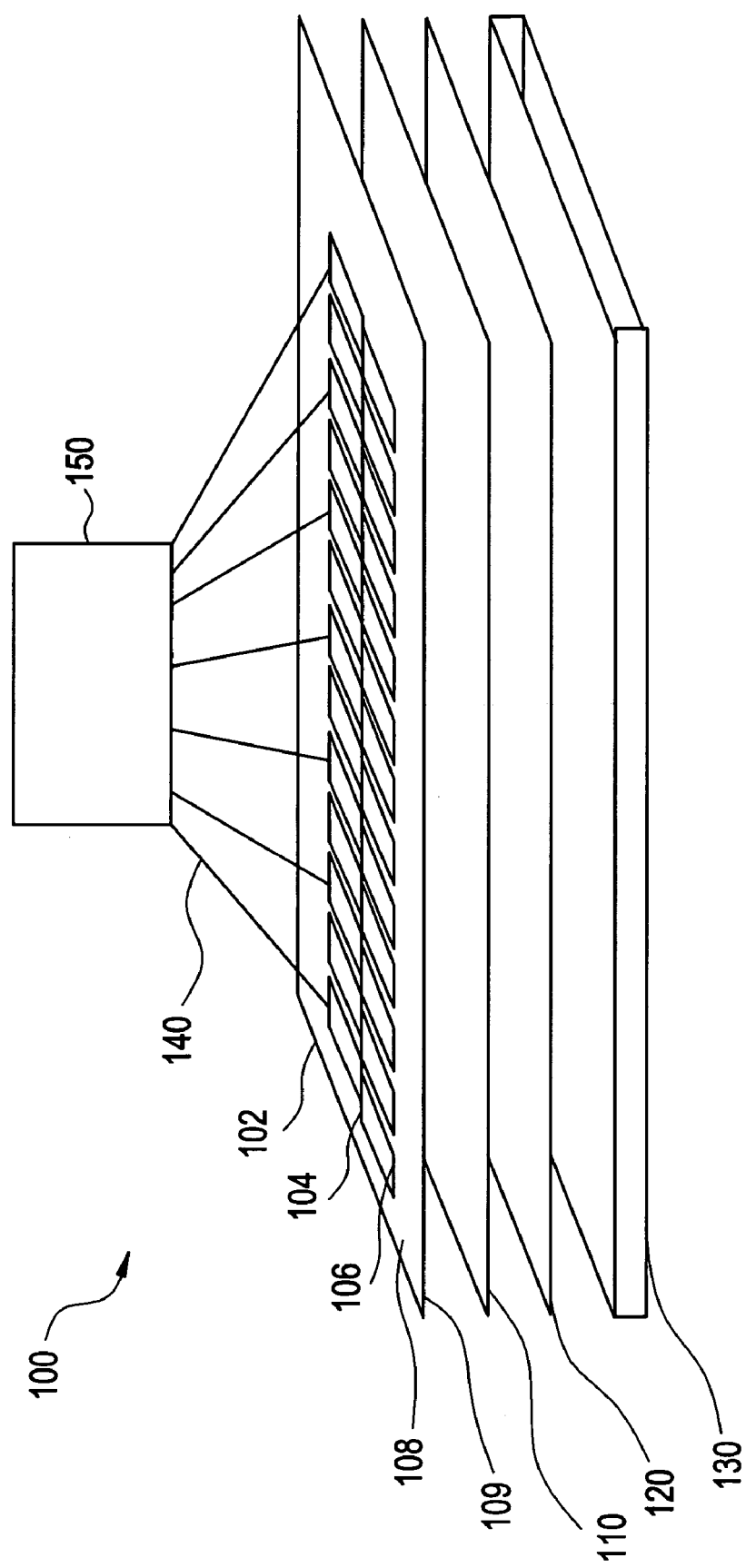

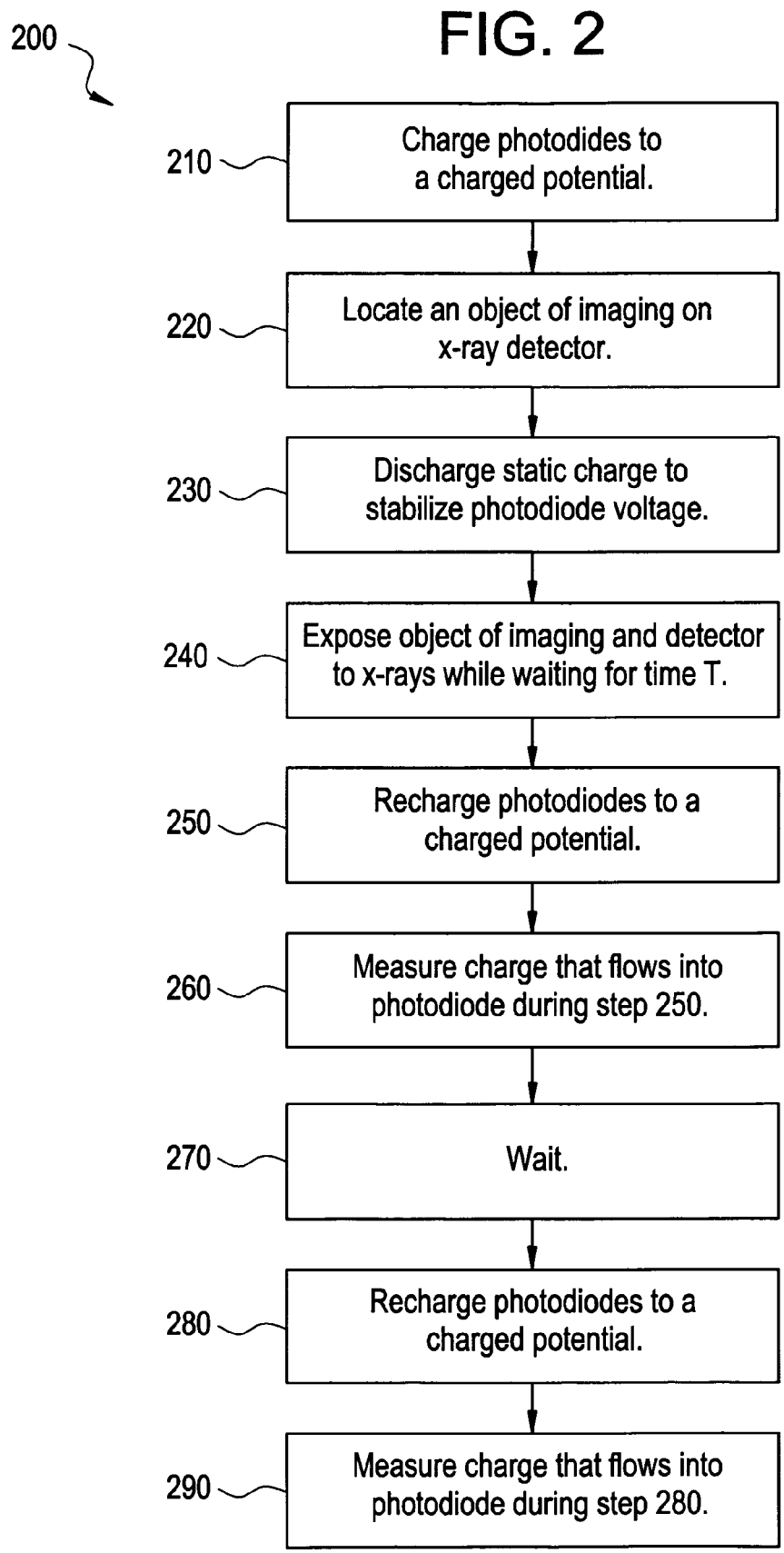

SYSTEM, METHOD AND APPARATUS FOR IMPROVING STABILIZATION IN SOLID STATE X-RAY DETECTORS

RELATED APPLICATIONS

Not Applicable

FEDERALLY SPONSORED RESEARCH OR DEVELOPMENT

Not Applicable

MICROFICHE/COPYRIGHT REFERENCE

Not Applicable

BACKGROUND OF THE INVENTION

The present invention relates generally to the fields of x-ray imaging and digital x-ray detectors. More specifically, the present invention relates to a solid state x-ray detector which may rapidly stabilize under dynamic mechanical loads.

Prior art digital x-ray detectors may be generally constructed in the following manner. Starting with a substrate with an interior and exterior surface, a number of detector elements are arranged onto the exterior surface of the substrate. The arrangement creates an array of detector elements. Each detector element includes a scintillator and a photosensor. The scintillator converts x-ray energy into light energy. The photosensor, in turn, is sensitive to the visible light energy. A layer of absorptive material, such as black or dark colored vinyl, is located on the interior surface of the substrate. The absorptive material absorbs light and heat emitted from the detectors during x-ray detection. Supporting the material, a base or a frame that is grounded may be provided. The base may be grounded to a chassis, earth, or to any other suitable common.

The substrate may comprise an insulating material such as glass. Alternatively, the substrate may comprise a conductive material. In the case of the substrate comprising a conductive material, a non-conductive material may be applied to the exterior surface before arranging the array of detector elements.

Present day solid state photosensors for use in x-ray imaging are typically formed from amorphous silicon photodiodes. Amorphous silicon photodiodes have an intrinsic capacitance. Thus, each photodiode acts like a capacitor—e.g. the photodiode may be charged to a charged voltage, or it may be discharged.

In order to obtain an accurate x-ray image using a digital detector, it is necessary to compensate for variations between individual detector elements. Compensation may be accomplished by taking at least two separate readings from individual detector elements to generate a single x-ray image, for example.

The following method may be used to generate an x-ray image with solid state detectors. First, each detector element is charged to a charged voltage, based on each photodiode's intrinsic capacitance. Then, an x-ray source provides x-rays to the detectors for a period of time T. Exposure to x-rays causes charge to be depleted from a detector element, and therefore for the voltage to drop across each photodiode. After exposure to x-rays, each detector element is recharged. During recharging, an amount of charge (or, alternatively, current) that flows into each detector element is measured. Each recharge measurement represents an amount of x-ray energy detected by each detector element plus offset characteristics of each detector element. In other words, each recharge measurement represents a noisy signal at each detector element.

To compensate for the effects of noise/offset, a second measurement may be taken—a "dark image." After an initial noisy signal measurement is made, a delay may occur, and then each detector element is recharged again. During recharging, an amount of current/charge that flows into each detector element is again measured. Each recharge measurement represents each detector element offset. The sum of these measurements for an array of detector elements is a "dark image," because the dark image measurement is acquired without exposing the detector elements to x-rays. The dark image (second measurement) is subtracted from the noisy signal image (first measurement). In this manner, noise due to detector element variations may be accounted for in the final x-ray image, for example.

It may be preferable to delay before acquiring the dark image to account for system leakages. This delay period may be the same as the delay T between the initial charging of the detector array and the noisy signal image acquisition. Using this method, the steps for image acquisition may be as follows: charge the detector array; delay for a period of time T while exposing the array to x-rays; recharge array while measuring charge flow to obtain noisy signal image; delay for a period of time T; recharge the detector array while measuring charge flow to obtain dark image. Assuming the system leaks in a substantially repeatable manner over a period of time T, the image acquisition system may account for system leakages. Alternatively, the second delay period may be chosen to be a period of time other than T, based on known or assumed system charge leakage over time.

Measurements described above are sensitive, and involve relatively small amounts of charge or current. A variety of noise factors may reduce the accuracy of this measurement. One such noise factor is electromagnetic interference (EMI) due to static charge.

Digital x-ray detectors offer many advantages over conventional radiographic film cassette imaging systems. Radiographic film must be developed, which costs time and money. Film must be stored in a physical space. Also, film must be physically changed to make additional images.

In spite of these and other shortcomings, radiographic film detectors still have at least one important advantage over prior art digital x-ray detectors. Film-based detectors may accommodate dynamic mechanical loads without a significant loss in image quality. In contrast, prior art digital x-ray detectors take a relatively long time to stabilize after a shift in mechanical load. During stabilization, digital imaging systems produce degraded images. Every time the forces change, the system must stabilize again to provide accurate images.

One cause of digital x-ray detector destabilization is static electricity. As mechanical loads on a detector vary, the bottom surface of a detector glass plate rubs against other materials in the detector, such as an absorptive layer. Friction and contact cause static electricity to accumulate on the interior surface of the glass, which is non-dissipative. The absorptive layer, for instance, is a poor insulator, and prevents static charge from rapidly discharging into a conducting base of the detector, such as a metal base. As the charge slowly discharges from the glass plate to the base, system voltages and electric fields change. The solid state detector elements and measurement systems may be sensitive to these changing voltages and fields. The slow dissipation of static charge may be a significant source for error and noise in the measurement process. Slow dissipation of static charge may reduce the accuracy of both x-ray noisy signal measurements and dark image measurements.

Thus, there is a need for a digital x-ray detector system which may rapidly stabilize under dynamic mechanical loads. Additionally, there is a need for a digital x-ray detector system which may dissipate static charge to improve image quality.

BRIEF SUMMARY OF THE INVENTION

Certain embodiments of the present invention provide a method, system, and apparatus for improving stabilization in solid state x-ray detectors. In an embodiment, a method for detecting x-rays includes providing a solid state x-ray detector with a top layer, where the top layer includes both an exterior surface and an interior surface. The interior surface is substantially electrically non-dissipative. The method further includes providing a dissipative layer adjacent to the interior surface of the top layer. Also, the method includes discharging at least a portion of electrical charge stored on the interior surface through the dissipative layer.

In an embodiment, the method for detecting x-rays further includes providing a plurality of solid state x-ray detector elements. Each detector element comprises a voltage and a capacitor. The capacitor has a charged potential.

In another embodiment, the method for detecting x-rays further includes stabilizing the voltages of at least a portion of the plurality of detector elements. In an additional embodiment, the method includes measuring an amount of charge used to charge each detector element capacitor up to a substantial portion of the capacitor's charged potential.

In an embodiment of the method, the top layer comprises glass. In another embodiment, the absorptive layer comprises vinyl. In an embodiment, the method for detecting x-rays further includes positioning an object at least partially onto the exterior surface of the top layer. In an embodiment, the method further includes directing x-rays through the object towards at least a portion of the plurality of x-ray detector elements.

In another embodiment, the dissipative layer comprises indium tin oxide. In yet another embodiment, the dissipative layer comprises a substantially opaque material.

In an embodiment, a system for detecting x-rays includes a top layer having an exterior and interior surface. The interior surface is substantially electrically non-dissipative. The system further includes an electrical ground path and an electrically dissipative layer adjacent to the interior surface of the top layer. The electrically dissipative layer is capable of facilitating discharge of static charge from the interior surface of the electrically non-dissipative layer to the electrical ground path.

In an embodiment, the system for detecting x-rays further includes a plurality of x-ray detector elements positioned on the exterior surface of the top layer. Each of the x-ray detector elements has at least one voltage. In another embodiment, the electrically dissipative layer is capable of substantially stabilizing the at least one voltage of at least a portion of the x-ray detector elements. In yet another embodiment, the system for detecting x-rays further includes an absorptive layer interposed between the electrically dissipative layer and the electrical ground path.

In an embodiment, an x-ray detector apparatus includes a top layer having an interior and exterior surface. The interior surface is substantially electrically non-dissipative. The apparatus includes plurality of solid state x-ray detector elements located on the exterior surface of the top layer. The apparatus also includes a base with an electrical ground path. The apparatus also includes a dissipative layer interposed between the top layer interior surface and the base.

In an embodiment, the apparatus additionally includes a substantially opaque layer interposed between the top layer interior surface and the base. In another embodiment, the substantially opaque layer of the x-ray detector apparatus includes a substantially electrically non-conducting material. In another embodiment, the substantially opaque layer includes vinyl.

In yet another embodiment, the top layer includes glass. In an embodiment, each of the plurality of solid state x-ray detector elements includes a photodiode. In yet another embodiment, the apparatus includes at least one charge measurer that is capable of measuring an amount of charge that flows into each of the solid state x-ray detector elements.

BRIEF DESCRIPTION OF SEVERAL VIEWS OF THE DRAWINGS

FIG. 1 shows an apparatus for detecting x-rays according to an embodiment of the present invention.

FIG. 2 shows a flow diagram for method for detecting x-rays according to an embodiment of the present invention.

DETAILED DESCRIPTION OF THE INVENTION

Figure 3A:
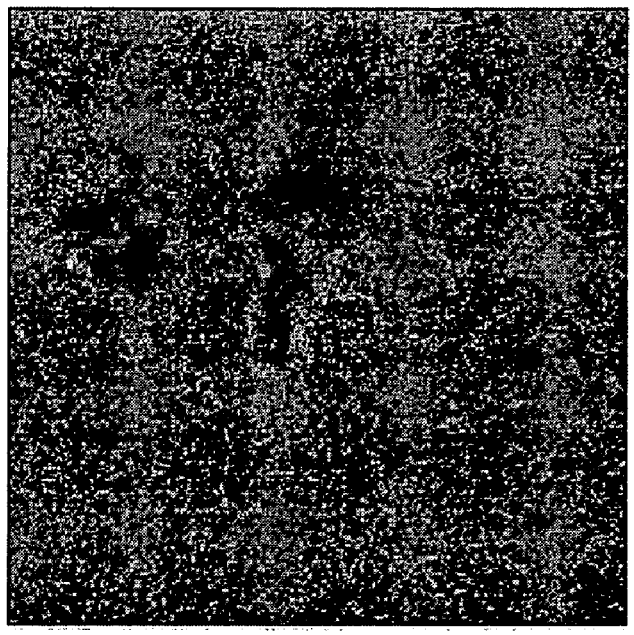
FIG. 3a shows an image taken from an x-ray detector without a dissipative layer.

Turning to FIG. 1, an embodiment of a digital x-ray detector 100 is shown. The detector 100 has a non-dissipative layer 102, an absorptive layer 120, and a base 130. The non-dissipative layer has an exterior surface 108 and an interior surface 109. The non-dissipative layer 102 is a poor dissipater of static charge. The non-dissipative layer 102 may comprise, for example, glass. The non-dissipative layer 102 has an array 104 of x-ray detector elements 106 on the exterior surface 108.

Each detector element 106 includes a scintillator, which converts x-ray energy into light energy and a photosensor. On the interior surface of the non-dissipative layer 109, an absorptive layer 120 absorbs heat and stray light generated by the array 104 of detector elements 106 during x-ray detection. By way of example, the absorptive layer 120 may comprise a vinyl material, such as a dark colored vinyl or black vinyl.

The array 104 of detector elements 106 is connected to an x-ray imaging system 150 by scan and read lines 140. The x-ray imaging system 150 measures an amount of charge or current that recharges each detector element 106 to generate x-ray images. The x-ray imaging system 150 may also assist in conditioning the detector elements 106 prior to the imaging process and during the imaging process.

Interposed between the interior surface of the non-dissipative layer 109 and the absorptive layer 120, there is a dissipative layer 110. Supporting the absorptive layer 120 is a base 130. The base 130 is, at least in part, a good conductor electricity, and may be connected to chassis ground, earth ground, or any other acceptable common. The absorptive layer 120, however, is a poor conductor of electricity. Therefore, without the dissipative layer 110, static charge may accumulate on the interior surface of the non-dissipative layer 109. The dissipative layer 110 is provided in order to reduce static charge from accumulating on the interior surface of the non-dissipative layer 109.

Static charge accumulates on some materials when the material comes into contact with certain complementary materials. This phenomenon is called the triboelectric effect. The triboelectric effect is magnified when certain complementary materials rub against each other, causing friction. Glass and vinyl, for example, are two complementary materials known to produce static accumulations due to the triboelectric effect.

Therefore, static charge may accumulate on the interior surface of the non-dissipative layer 109 when there is contact between the interior surface of the non-dissipative layer 109 and a complementary material. One such complementary material may be, for example, the absorptive layer 120. Static charge accumulation may be magnified when there is rubbing or friction between the interior side of the non-dissipative layer 109 and the complementary material. Contact or friction may happen any time there is a shift in mechanical forces on the x-ray detector 100. For instance, contact or friction may happen when an object of imaging is placed upon the x-ray detector 100, or when an object is removed from the x-ray detector 100. Moreover, contact or friction may happen when an object of imaging, such as a person, shifts while on the x-ray detector 100.

The dissipative layer 110 may, therefore, be provided to reduce the generation and accumulation of static charge. The dissipative layer 110 may reduce the chance of contact and friction between a complementary material (such as the absorptive layer 120) and the interior surface of the non-dissipative layer 109. Also, the dissipative layer 110 may facilitate the dissipation of any accumulated charge on the interior surface of the non-dissipative layer 109. The ability of the dissipative layer 10 to facilitate discharge of accumulated static from the interior surface of the non-dissipative layer 109 is dependent, at least in part, on the amount of surface area contact between the dissipative layer 110 and the interior surface of the non-dissipative layer 109. In a preferred embodiment, the dissipative layer 110 is applied to the interior surface of the non-dissipative layer 109 to improve surface area contact between the dissipative layer 110 and the interior surface of the non-dissipative layer 109.

The dissipative layer 110 may include a variety of substances, such as indium tin oxide, conductive paint, conductive foil, conductive mesh, conductive fibers, static dissipative paint, or any other conductive or dissipative material. Therefore, the term "dissipative" as used in the present application includes dissipative materials (materials with surface resistivity between $10^5$ Ω/sq and $10^{12}$ Ω/sq) as well as conductive materials (materials with surface resistivity less than $10^5$ Ω/sq), for example. The dissipative layer 110 may be a separate component, or may be applied to the interior surface of the non-dissipative layer 109, or may be applied to, or may be part of, the absorptive layer 120. The dissipative layer may be applied to the non-dissipative layer 109 or the absorptive layer 120 by a variety of coating methods, such as by automatic sprayer, squeegee, paint brusher, silk screen, or sputter. Static dissipation is well-known in the art, and many conductive or dissipative materials may be suitable for discharging static charge from the digital x-ray detector 100. Moreover, conductive or dissipative materials may be provided or applied by a variety of well-known methods.

In one embodiment, the dissipative layer 110 may comprise an opaque material or a substantially opaque material. A substantially opaque dissipative layer 110 may be capable of absorbing heat and light generated during x-ray imaging. In this embodiment, it may not be necessary to include the absorptive layer 120 if the dissipative layer 110 adequately absorbs heat and light. As an example, the dissipative layer 110 may comprise a dark colored static dissipative paint, or may comprise a dark colored indium tin oxide material.

FIG. 2 shows a flowchart representing a method for detecting x-rays used in accordance with an embodiment of the present invention. At step 210, the photodiodes are charged to a charged potential. At step 220, an object of imaging is located on the x-ray detector 100. In an embodiment, step 220 may be performed before step 210, or step 220 may be omitted.

At step 230, static charge is discharged to stabilize the photodiode voltages. In an embodiment, step 230 may be performed at any time. For instance, step 230 may be performed periodically. In an embodiment, step 230 is performed throughout the operation of the digital x-ray imaging system.

At step 240, the detector and object of imaging are exposed to x-rays. In an embodiment, step 240 may be omitted. In another embodiment, x-ray exposure may not take place during step 240, although a wait time T may still occur. Step 240 lasts for a period of time T. T may be any length of time. In an embodiment, T is 500 ms, for example, although T may vary.

The photodiodes are then recharged to a charged potential at step 250. While the photodiodes are being recharged, an amount of charge/current that flows into each photodiode is measured at step 260. The sum of the measurements taken at step 260 represent a noisy signal. At step 270, a delay occurs. The delay may be any length of time. In an embodiment, the delay at step 270 is the same as the time T at step 240. In another embodiment, the delay at step 270 is a portion of the time T at step 240. In an embodiment, the delay time is 500 ms, for example, although the delay time may vary. Some or all of steps 240, 250, 260, and 270 may be repeated any number of times. Additionally, some of steps 240, 250, 260, and 270 may be omitted during some or all repetitions. In an embodiment, steps 240, 250, 260, and 270 are repeated at least two times.

At step 280, the photodiodes are recharged to a charged potential. The amount of charge/current that flows to each photodiode during step 280 is measured at step 290. The sum of measurements taken at step 290 represent a dark image. Steps 280 and 290 may be repeated any number of times, and optionally, additional delay periods (step 270) may be introduced. Additionally, step 290 may be performed concurrently with step 280. In an embodiment, steps 270, 280, and 290 are repeated at least two times.

FIG. 3a shows an image taken from an x-ray detector without a dissipative layer 110. The image in FIG. 3a was acquired 16 seconds after unloading a 4 kg (8.8 lb) weight from the detector. The image in FIG. 3a is, a combination of at least two separate measurements—a first measurement minus a second measurement. No x-ray source was used during the generation of FIG. 3a. Both the first and second measurements are "dark images." Ideally, the first and second dark images should be equivalent, and a null image should result. However, FIG. 3a shows significant distortions. These distortions occur because the first measurement is not equal to the second measurement.

Figure 3B:
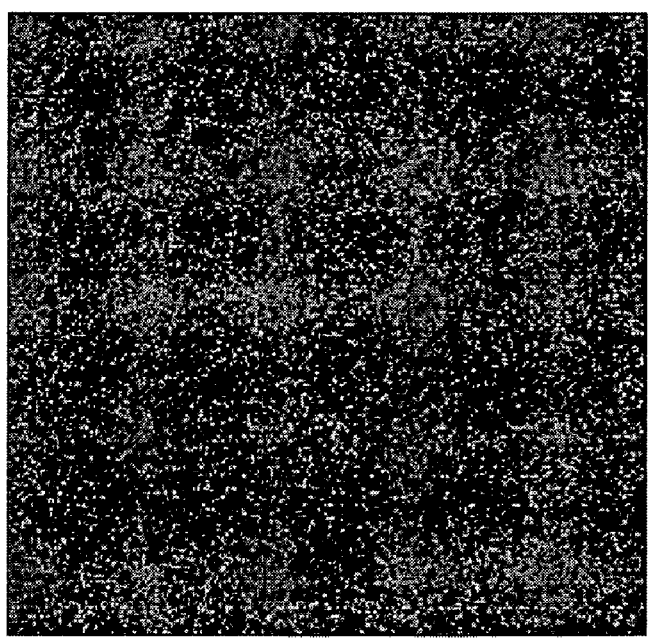
FIG. 3b shows an image taken from an x-ray detector comprising a dissipative layer.

FIG. 3b shows an image taken from an x-ray detector comprising a dissipative layer 110. The image in FIG. 3b was acquired 0.5 seconds after unloading a 22.7 kg (50 lb) weight from the detector. The method used to obtain the image in FIG. 3b was the same as the method used in FIG. 3a—i.e. subtracting two dark images.

Compare the image in FIG. 3b, which was generated 500 ms after unloading a 22.7 kg, with the image in FIG. 3a, which was generated 16 seconds after unloading a 4 kg weight. In FIG. 3b, there is almost no visible distortion. The first and second measurements are substantially equal, and the resulting image is virtually a null image. Only 500 ms after unloading the 22.7 kg weight, the detector has substantially stabilized. By contrast, FIG. 3a shows significant distortion at 16 seconds after unloading a 4 kg weight. With respect to dynamically shifting loads, the x-ray detector with the dissipative layer 110 stabilizes more effectively than the x-ray detector without the dissipative layer 110.

Thus, certain embodiments provide improved stabilization in a solid state x-ray detector that may be subjected to dynamic mechanical loads and forces. Certain embodiments facilitate discharge of accumulated static charge from a solid state x-ray detector. Certain embodiments facilitate less distortion in x-ray images taken fro a solid state x-ray detector. Therefore, certain embodiments facilitate improved x-ray imaging in a solid state x-ray detector when an object of imaging is located on the x-ray detector.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for detecting x-rays comprising:
   providing a solid state x-ray detector with a top layer including an exterior surface and an interior surface, wherein said interior surface of said top layer is substantially electrically non-dissipative;
   providing a dissipative layer adjacent to said interior surface of said top layer; and
   discharging at least a portion of electrical charge stored on said interior surface of said top layer through said dissipative layer; and
   providing a plurality of solid state x-ray detector elements, each detector element further comprising a capacitive portion capable of storing an amount of charge based on a voltage across said capacitive portion.

2. The method of claim 1 further comprising stabilizing said voltages across said capacitive portions of at least a portion of said plurality of solid state x-ray detector elements.

3. The method of claim 2 further comprising measuring an amount of charge used to charge said capacitive portion up to a substantial portion of a charged potential.

4. The method of claim 1 wherein said top layer comprises glass.

5. The method of claim 1 further comprising the step of providing an absorptive layer.

6. The method of claim 5 wherein said absorptive layer comprises vinyl.

7. The method of claim 1 further comprising the step of positioning an object at least partially onto said exterior surface of said top layer and directing x-rays through said object towards said solid state x-ray detector.

8. The method of claim 1 wherein said dissipative layer comprises a substantially opaque material.

9. The method of claim 1 wherein said dissipative layer comprises indium tin oxide.

10. An system for detecting x-rays comprising:
    a top layer having an exterior surface and an interior surface, wherein said interior surface of said top layer is substantially electrically non-dissipative;
    an electrical ground path; and
    an electrically dissipative layer adjacent to said interior surface of said top layer, wherein said electrically dissipative layer is capable of facilitating discharge of static charge from said interior surface of said top layer to said electrical ground path; and
    a plurality of x-ray detector elements positioned on said exterior surface of said top layer, each of said plurality of x-ray detector elements including at least one voltage across a capacitive portion of said x-ray detector element.

11. The system of claim 10 wherein said electrically dissipative layer is further capable of substantially stabilizing said at least one voltage of at least a portion of said plurality of x-ray detector elements.

12. The system of claim 10 further comprising an absorptive layer interposed between said electrically dissipative layer and said electrical ground path.

13. A x-ray detector apparatus comprising:
    a top layer having an exterior surface and an interior surface, said interior surface being substantially electrically non-dissipative;
    a plurality of solid state x-ray detector elements located on said exterior surface of said top layer;
    a base including an electrical ground path; and
    a dissipative layer interposed between said top layer interior surface and said base.

14. The apparatus of claim 13 further comprising a substantially opaque layer interposed between said top layer interior surface and said base, wherein said substantially opaque layer comprises a substantially electrically non-conducting material.

15. The apparatus of claim 14 wherein said substantially opaque layer comprises vinyl.

16. The apparatus of claim 13 wherein said interior surface of said top layer comprises glass.

17. The apparatus of claim 13 wherein each of said plurality of solid state x-ray detector elements further comprises a photodiode.

18. The apparatus of claim 13 further comprising at least one charge measurer, said charge measurer capable of measuring an amount of charge that flows into each of said solid state x-ray detector elements.

* * * * *